United States Patent [19]
Uchiyama et al.

[11] 3,984,678
[45] Oct. 5, 1976

[54] APPARATUS FOR AUTOMATICALLY ADJUSTING A MICROSCOPE IN FOCUS

[75] Inventors: Yasushi Uchiyama, Yokohama; Daikichi Awamura, Kawasaki, both of Japan

[73] Assignee: Nippon Jido Seigyo Ltd., Kawasaki, Japan

[22] Filed: Mar. 31, 1975

[21] Appl. No.: 563,952

[30] Foreign Application Priority Data
Apr. 5, 1974 Japan................. 49-37999
Feb. 14, 1975 Japan................. 50-17936

[52] U.S. Cl. .............. 250/231 P; 73/388 BN; 250/201; 350/46; 350/255; 355/56
[51] Int. Cl.² ............................. G02B 7/11
[58] Field of Search ........... 250/231 P, 231 R, 237, 250/201; 352/140; 356/125; 350/41, 46, 186, 255; 353/101; 355/56; 354/25; 73/37.5, 388 BN

[56] References Cited
UNITED STATES PATENTS

| | | |
|---|---|---|
| 3,326,081 | 6/1967 | White .................... 355/56 X |
| 3,519,334 | 7/1970 | Heitmann et al. ......... 350/255 |
| 3,704,657 | 12/1972 | Sliwkowski et al. ....... 355/56 X |

*Primary Examiner*—Eugene La Roche
*Attorney, Agent, or Firm*—Stevens, Davis, Miller & Mosher

[57] ABSTRACT

An apparatus for automatically adjusting a microscope in focus, said microscope comprising a stage on which a specimen is to be placed, an objective, an objective tube and a driving member for relatively moving said stage and objective tube. Said apparatus comprises a nozzle member mechanically coupled to said objective tube and being opposed to the specimen, said nozzle being connected to an air pump so as to blow or suck an air stream from said nozzle member, a pressure detector for detecting pressure variations of said air stream to produce an electric signal which varies as a function of a distance between said objective and specimen and an electric motor energized with a signal related to said electric signal and mechanically coupled to said driving member of the microscope.

12 Claims, 7 Drawing Figures

FIG._1
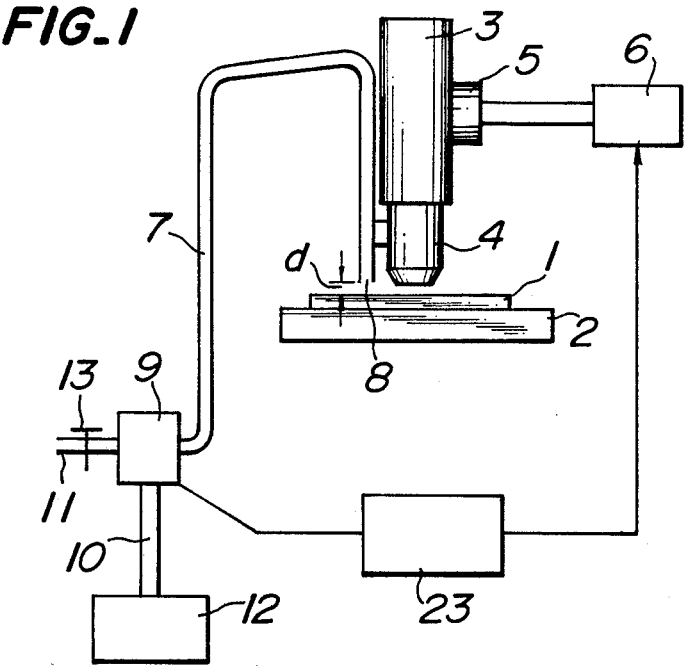
FIG._2
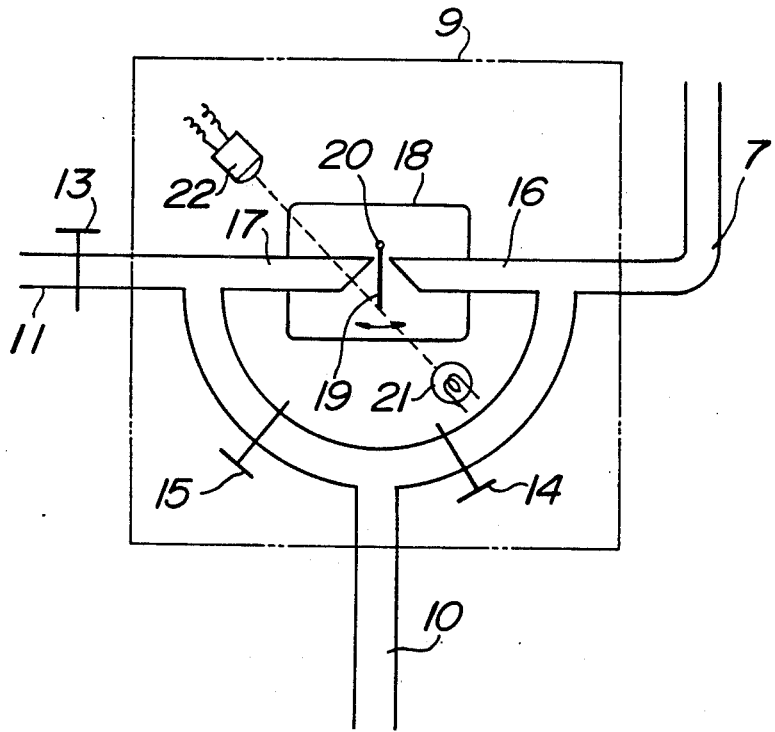

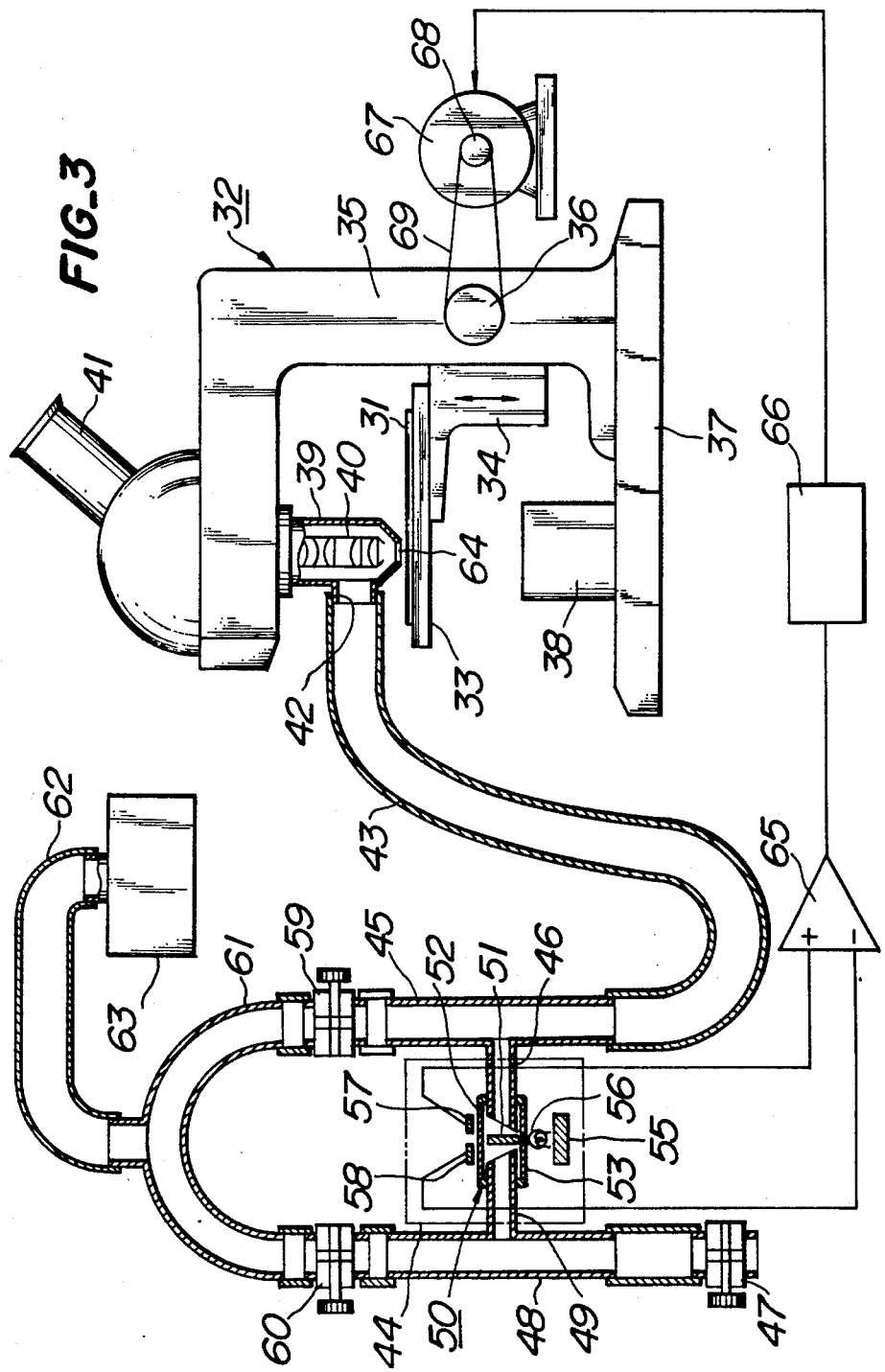

FIG._4
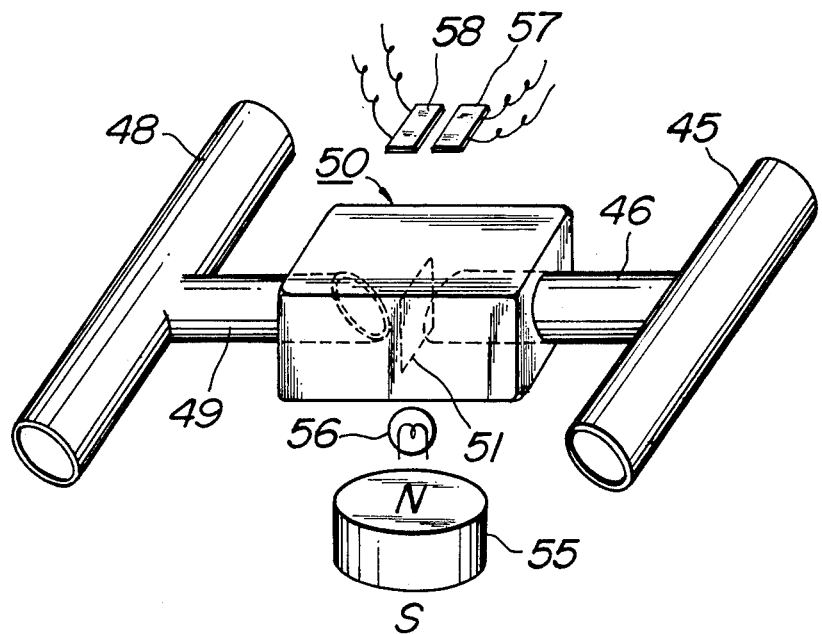
FIG._5
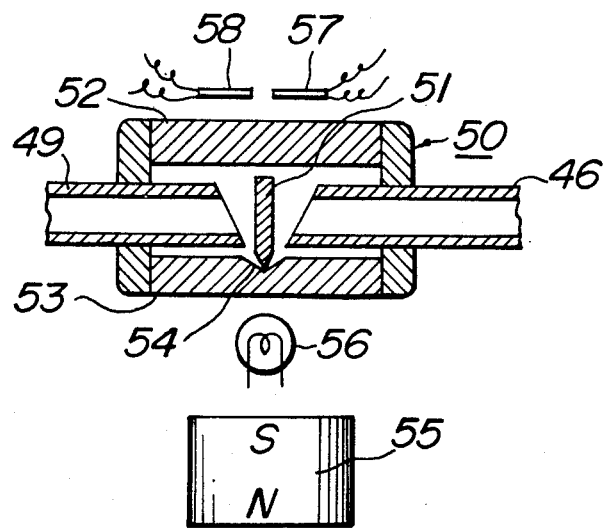

APPARATUS FOR AUTOMATICALLY ADJUSTING A MICROSCOPE IN FOCUS

BACKGROUND OF THE INVENTION

The present invention relates to an apparatus for adjusting automatically a microscope in focus with a high accuracy.

In steps of manufacturing a semiconductor integrated circuit there is a step for photoetching a silicon wafer of high purity. In this manufacturing process on a surface of the silicon wafer having deposited a photo resist thereon is placed a mask having a given pattern, the photo resist is irradiated by visible light or ultraviolet ray through said mask and then the silicon wafer is selectively etched after developing the photo resist. Such a mask is generally formed by vapor depositing a uniform metal film such as chromium and nickel on a glass plate and the metal layer is selectively photo-etched in accordance with the given pattern. In this case before forming the pattern in the metal film it is necessary to check and assure that the metal film does not include any serious pin hole. In general when the metal film includes a pin hole having a diameter larger than $2\mu$, integrated circuits manufactured using the mask which has been formed by such a metal film might be inferior. Particularly in integrated circuits of high integration the metal film having a pin hole of a diameter of about $1\mu$ results in unfavorable semiconductor integrated circuits.

In the invention a microscope is utilized for checking pin holes in the above mentioned metal film. In order to find a pin hole having a diameter larger than $1\mu$, it is necessary to use a microscope which has a magnification of about 200. The microscope having such a large magnification has a short focal depth of 4 to $5\mu$. On the contrary the surface of the glass plate of the mask is ground and polished to only such an extent that its surface fluctuation amounts to about $10\mu$. Thus during the examination of the metal film by relatively moving the microscope and glass plate in a direction parallel to the surface of the glass plate, there is a fear that the microscope may become out of focus. Since the metal film deposited on the glass plate has been carefully treated and thus there are only a few pin holes in the metal film, it is difficult for an observer to be aware during the examination that the microscope becomes out of focus and thus the observer fails to find pin holes. Moreover even if the observer finds that the microscope is out of focus, it is quite difficult to readjust accurately the microscope into focus when there is no pin hole within the field of view. In practice when the microscope is to be readjusted, the microscope and the glass plate placed on a stage of the microscope are moved relative to each other so that an edge portion of the glass plate comes in the field of view. Therefore readjustment of the microscope is quite troublesome.

Further in order to examine the glass plate having an area of, for example 50mm×50mm using the microscope it takes several hours. During a such long time period the observer must be always paying attention whether or not the microscope is in focus, which is extremely annoying and the observer is very much tired. Moreover in order to design an apparatus for automatically checking pin holes in the metal film, the above mentioned defocus of the microscope will be a serious drawback and an accurate examination could not be expected. Therefore it is required to develop an auto-focusing apparatus of high accuracy. Many auto-focusing apparatuses have been proposed, but their accuracy is very low. Therefore the known auto-focusing apparatus could not be applied to the microcscope having a relatively short focal depth.

SUMMARY OF THE INVENTION

The present invention has for its object to provide an apparatus for automatically adjusting the microscope in focus with a very high accuracy.

It is another object of the invention to provide an apparatus for automatically adjusting the microscope in focus, which microscope is used for checking pin holes in the metal film deposited on the glass plate which is used as the mask in manufacturing the integrated circuits.

According to the invention an apparatus for automatically adjusting a microscope in focus, said microscope having a stage on which a specimen is to be placed, an objective for forming an image of the specimen, an objective tube having said objective installed therein, a driving member for relatively moving said objective tube and stage in a direction of an optical axis of said objective, comprises a nozzle member mechanically coupled to said objective tube, a tube means for connecting said nozzle to an air pump to blow or suck an air stream from said nozzle member, a pressure detector connected in said tube means for detecting pressure variations of said air stream to produce an electric signal which varies as a function of a distance from said objective to said specimen, and an electric motor mechanically coupled to said driving member of the microscope and for receiving a signal related to said electric signal to maintain said distance to be constant.

BRIEF DESCRIPTION OF THE DRAWING

FIG. 1 is a schematic diagram showing a first embodiment of the auto-focusing apparatus according to the invention;

FIG. 2 is a schematic view of a pressure detector used in the auto-focusing apparatus shown in FIG. 1;

FIG. 3 is a partially cross sectional view illustrating a second embodiment of an auto-focusing apparatus according to the invention;

FIG. 4 is a perspective view showing a pressure detector used in the apparatus of FIG. 3;

FIG. 5 is a cross section of the pressure detector shown in FIG. 4;

DESCRIPTION OF THE PREFERRED EMBODIMENTS

Figure 6:
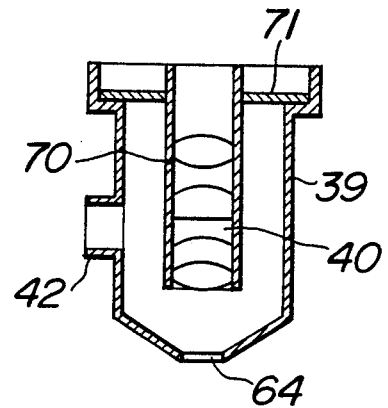
FIG. 6 is a cross section showing another embodiment of an objective tube.

FIG. 1 shows a first embodiment of an auto-focusing apparatus according to the invention. In this embodiment a specimen 1, for example a glass plate having deposited a metal film thereon is placed on a stage 2 of a microscope. The stage 2 can be moved laterally as well as backward and foward relative to a main body 3 of the microscope. An objective tube 4 is secured to the main body 3 in such a manner that it can be moved up and down relative to the stage 2 by means of an up and down mechanism 5 which is mechanically coupled to a reversible electric motor 6. To the objective tube 4 is fixed a tube 7 having a nozzle 8 at its free end so that the nozzle 8 moves up and down together with the objective tube 4. The nozzle 8 is arranged opposite to the glass plate 1. The other end of the tube 7 is connected to a pressure detector 9. To this detector 9 are also coupled two tubes 10 and 11, the tube 10 being connected to an air pump 12 and the other tube 11 being opened to the ambient air through a first valve 13.

A detailed construction of the pressure detector 9 is shown in FIG. 2. The tubes 7 and 10 are coupled to each other through a second value 14 and the tubes 10 and 11 are also connected to each other by means of a third valve 15. To the tubes 7 and 11 are coupled branch tubes 16 and 17, respectively. These branch tubes 16 and 17 are introduced into a transparent housing 18 in an air tight manner. Free ends of the branch tubes 16 and 17 are tapered and are opposed to each other. At least an end portion of the tube 17 is made transparent. Between the tapered ends of the branch tubes 16 and 17 is arranged an opaque blade or flapper 19 having an extremely small weight. The flapper 19 may be made of a thin metal plate such as a steel. The flapper 19 is pivotally supported by an axis 20 in such a manner that it can swing or rotate around the axis 20. The flapper 19 serves to substantially close openings of the branch tubes 16 and 17. Outside of the transparent housing 18 are arranged a light source 21 and a photoelectric converting element 22 such as a photo cell. They are so arranged that an optical axis of the light source 21 and photo cell 22 passes through the flapper 19 and an amount of light received by the photo cell 22 changes in dependence on a position of the flapper 19. That is to say when the flapper 19 rotates in the anti-clockwise direction in FIG. 2, a large amount of light is received by the photo cell 22, while when the flapper 19 moves in the clockwise direction, the light amount received by the photo cell 22 decreases. Output from the photo cell 22 is supplied to a driving amplifier 23 (see FIG. 1) and the amplified signal is supplied to the motor 6.

The above auto-focusing apparatus according to the invention operates as follows. In a preliminary step the valves 13, 14 and 15 are so adjusted that when a distance $d$ between the surface of glass plate 1 and the nozzle 8 is a given value $d_0$, i.e. when the microscope is in focus, air pressures in the branch tubes 16 and 17 are equal to each other and thus there is no air stream in the housing 9. In this case, the flapper 19 is in a neutral position and hangs perpendicularly. The air pressure in the branch tube 16 is in dependence on a magnitude of resistance against the air stream blowing from the nozzle 8 and thus varies as a funtion of the distance $d$. When the distance $d$ is increased, the air pressure in the branch tube 16 decreases, while when the distance $d$ is decreased the pressure in the tube 16 increases. The air pressure in the other branch tube 17 is determined by the adjustment of the first valve 13 and can be made constant. When the distance $d$ becomes shorter than the given value $d_0$ and the pressure in the branch tube 16 becomes higher than that in the branch tube 17, the air stream flows from the tube 16 to the tube 17 in the housing 18 and the flapper 19 is subjected to this air stream and swings in the clockwise direction so as to close the branch tube 17. In this case the light beam emitted from the light source 21 is inhibited by the opaque flapper 19 and is not incident upon the photo cell 22. Then the amplifier 23 supplies a signal to the motor 6 so as to move the objective tube 4 upward.

During the upward movement of the objective tube 4 the flapper 19 swings back in the anti-clockwise direction. When the distance $d$ becomes longer than the given value $d_0$, the pressure in the tube 16 becomes lower than that in the tube 17. Then the flapper 19 closes the branch tube 16. Therefore the light emitted from the light source 21 is incident upon the photo cell 22 without being interrupted by the flapper 19. In this case the amplifier 23 supplies such a signal to the motor 6 that the objective tube 4 moves downward. Therefore the distance $d$ decreases toward the given value $d_0$. When the distance $d$ becomes shorter than the given value $d_0$, the above operation is repeated. In this manner the distance $d$ increases and decreases alternately with respect to the given value $d_0$ and the objective tube 4 moves up and down. This operation is of an ON-OFF action and the microscope can be maintained in focus.

In the above pressure detector 9 even if the pressure of the air pump 12 fluctuates, it never affects the detection accuracy of the pressure difference, because the fluctuation of the air pump pressure appears in both tubes 16 and 17 to the same extent and in the housing 9 the pressure fluctuations in these tubes 16 and 17 are cancelled out. Therefore the pressure variations in the tube 16 can be detected accurately. Moreover since the air stream from the nozzle 8 blows dust off the glass plate 1, only pin holes in the glass plate 1 can be examined by the microscope.

In a practical apparatus the pressure of the air pump 12 is set at 500mm $H_2O$. When there is produced a pressure difference of 3mm $H_2O$ between the branch tubes, which corresponds to a distance variation of about $2\mu$, the flapper 19 is caused to swing. When such an apparatus was applied to the microscope having a focal depth of 4 to $5\mu$, the microscope could be effectively kept in focus for the glass plate 1 having the surface fluctuation up to $10\mu$.

In case of using a microscope having a revolving nosepiece, the tube 7 having the nozzle 8 at its free end may be fixed to a non-revolving portion of the main body of the microscope, so that even when the revolving nosepiece is rotated, the nozzle 8 can be fixed at a position.

FIG. 3 shows another embodiment of the auto-focusing apparatus according to the invention. Also in this embodiment a specimen 31, i.e. a glass plate having a metal film deposited thereon is placed on a stage 33 of a microscope 32. The stage 33 is made slidable laterally as well as backward and forward. The stage 33 is connected to a stage mount 34 which is secured to an arm 35 in a vertically slidable manner. On the arm 35 there is provided a stage handle 36 and the stage 33 can be moved up and down by rotating the stage handle 36.

The arm 35 of the microscope 32 is firmly fixed to a base 37 on which is also arranged an illumination light source 38 so as to illuminate the glass plate 31 from the bottom. To the arm 35 there are also secured an objective tube 39 having installed an objective 49 therein and an inclined tube 41 having arranged an eyepiece therein.

On the side wall of the objective tube 39 is formed an inlet 42 to which one end of a tube 43 is connected. The other end of the tube 43 is connected to one end of a pipe 45 which is coupled to a pressure detector 44. The pressure detector 44 comprises a first branch tube 46 which is coupled to the pipe 45 and a second branch tube 49 which is coupled to a pipe 48. One end of this pipe 48 is opened to the ambient air through a first valve 47.

The detailed construction of the pressure detector 44 is illustrated in FIGS. 4 and 5. Free ends of these branch tubes 46 and 49 are introduced into a housing 50 in an air tight manner. Both ends of the branch tubes 46 and 49 are tapered and are opposed to each other. Between these tapered ends is arranged a very thin iron blade 51. A lower edge of the iron blade 51 is formed as a knife edge. Upper and lower walls 52 and 53 of the housing 50 are made of transparent glass plates. On the inner surface of the lower glass plate 53 is formed a substantially V-shaped groove 54. The knife edge of the iron blade 51 is inserted in said groove 54. Below the lower plate 53 is arranged a permanent magnet 55 so that the iron blade 51 stands up straight on the lower wall 53 by means of a magnetic force produced by the magnet 55.

Below the lower wall 53 is also arranged a light source 56 and above the upper wall 52 is arranged a pair of photoelectric converting elements 57 and 58 such as photo cells.

As shown in FIG. 3 other ends of the pipes 45 and 48 are connected through second and third valves 59 and 60, a three-way tube 61 and a tube 62 to ana air pump 63. An air stream flows from the air pump 63 through the tube 62, the three-way tube 61, the valve 59, the pipe 45, the tube 43 and the inlet into the inside of the objective tube 39. As depicted in FIG. 3 there is a space between the objective tube 39 and the objective 40. Thus the air stream introduced into the objective tube 39 flows through said space and blows out of an opening 64 of the objective tube 39 which serves as a nozzle. At the same time the air stream flows from the air pump 63 throught the tube 62, the three-way tube 61, the valve 60, the pipe 48 and the first valve 47 to the ambient air.

Outputs of the photocells 57 and 58 are connected to positive and negative inputs of a differential amplifier 65, respectively and an output of the differential amplifier is connected to an input of a motor driving circuit 66. An output of the circuit 66 is connected to a reversible motor 67, a driving shaft 68 of which is mechanically coupled to the stage handle 36 of the microscope 32 by means of an endless belt 69.

As described above the opening 64 of the objective tube 39 of the microscope 32 operates as a nozzle and blows the air stream against the glass plate 31. Therefore the pressure in the pipe 45 varies in dependence on a distance between the glass plate 31 and the opening 64, i.e. a distance between the glass plate 31 and the objective 40.

The valves 47, 59 and 60 are so adjusted that when the distance between the objective 40 and the glass plate 31 is equal to a given distance at which the microscope is in focus, the pressure in the pipe 45 is equal to that in the pipe 48. Therefore when the microscope is in focus, the pressures in the branch tubes 46 and 49 are equal to each other and there is no air stream in the housing 50 of the the pressure detector 44. Thus the iron blade 51 is only subjected to the magnetic force of the magnet 55 and stands perpendicularly on the lower wall 53. In this situation amounts of light incident upon the photo cells 57 and 58 are identical with each other and these photo cells produce output signals of the same magnitude. Thus the output from the differential amplifier 65 is zero and the motor 67 is not energized. Therefore the stage 33 does not move.

When the distance between the objective 40 and the glass plate 31 is decreased and the microscope becomes out of focus, the pressure in the pipe 45 becomes higher than that in the pipe 48 and thus in the housing 50 an air stream flows from the branch tube 46 to the branch tube 49. Therefore the iron blade 51 is subjected to said air stream as well as the magnetic force of the magnet 55 and rotates in the anti-clockwise direction in FIGS. 3 and 5. As the result an amount of light received by the photo cell 58 is decreased due to the rotating blade 51, so that the output signal from the photo cell 58 becomes smaller than the output signal from the photo cell 57. In such a condition the differential amplifier 65 produces a signal of positive polarity and its magnitude is related to the amount of defocus of the microscope. The motor driving circuit 66 receives such a signal and supplies a driving signal for rotating the motor 67 in the forward direction. Then the stage handle 36 is rotated by means of the endless belt 69 and the stage 33 moves downward to increase the distance between the glass plate 31 and the objective 40. During this movement the blade 51 swings in the clockwise direction towards its neutral position. When the stage 33 reaches the neutral position at which the microscope is in focus, the blade 51 is in its neutral position and the differential amplifier 65 produces a zero output. Then the motor 67 is deenergized and the downward movement of the stage 33 stops.

When the distance from the glass plate 31 to the objective 40 is increased, the air stream flows from the branch tube 49 to the branch tube 46 in the housing 50 and thus the blade 51 swings in the clockwise direction. Therefore the output signal from the photo cell 58 becomes larger than that from the photo cell 57 and the differential amplifier 65 produces a negative output signal. The driving circuit 66 produces a signal for rotating the motor 67 in the reverse director, so that the stage 33 moves upward. When the stage 33 lifts to a position at which the microscope is in focus, the output of the amplifier 65 becomes zero and the motor 67 is deenergized, so that the stage 33 stops at such a position.

In the present auto-focusing apparatus the blade 51 can swing when a pressure difference of only about 1mm $H_2O$, which corresponds to a distance variation of about $0.5\mu$, is produced between the pipes 45 and 48, under the pump pressure of 500mm $H_2O$ so that the microscope having the focal depth of 4 to $5\mu$ can be maintained in focus by lifting and descending the stage 33 even if the glass plate 31 has the surface fluctuation of $10\mu$.

When comparing the second embodiment shown in FIG. 3 with the first embodiment of FIG. 1, the iron blade 51 of very small weight is merely placed on the lower wall 53 with its knife edge being inserted in the groove 54 and is caused to stand up straight by means of the magnetic force of the magnet 55, the friction against the rotation of the blade 51 is very small and thus it can swing or rotate in response to a very small pressure difference. Moreover the sensitively of the pressure detector 44 can be easily adjusted by means of suitably selecting the magnitude of the magnetic force. This can be simply effected by changing the distance between the blade 51 and the magnet 55. A specific oscillating frequency of the blade 51 can be also easily adjusted by changing the magnitude of the magnetic force. In the above embodiment of FIG. 3, the magnet 55 is formed by a permanent magnet, but it may be a D.C. electric magnet. In this case the magnitude of the magnetic force can be easily adjusted by controlling a magnitude of a D.C. current supplied to the electric magnet. Further in the second embodiment shown in FIG. 3 there are arranged two photo cells 57 and 58 and the position of the stage 33 is controlled in dependence upon differences in output signals from these photo cells. Therefore the control of the second embodiment is not of an ON-OFF action as the first embodiment, but of a linear action, so that when the stage 33 stops at a given position there is substantially no current flowing through the motor 67 and thus the motor 67 is not wastfully heated.

In the first embodiment the neutral position of the flapper 19 is determined by the gravity force, so that if the housing 9 is tilted, the flapper 19 is not in the neutral position even when there is no pressure difference in the branch tubes 16 and 17. On the contrary in the pressure detector 44 of the second embodiment since the iron blade 51 is subjected to the magnetic force, it can stand up straight on lower wall 53 even if the housing is tilted, so that an accurate detection is effected. In connection with this the whole pressure detector 44 may be turned upside down. In this case the blade 51 is hanging down from the top wall 53 by means of the magnetic force. Moreover the whole pressure detector 44 may be turned by substantially 90 degrees and the blade 51 may be held horizontally. In this case if the blade 51 could not be held horizontal by means of the magnetic force, there may be produced an air stream in the housing 50 for keeping the blade 51 in the horizontal position even in the in-focus condition by suitably adjusting the valves 47, 59 and 60. Alternatively the differential amplifier 65 may be so designed that it produces zero output signal when the two input signals differ from each other by a given amount.

In the embodiment shown in FIG. 3 use is made of the microscope with illumination of the transmission type, but a microscope with an illumination of a reflection type may be also used. In this type of the microscope when a dark field illumination is required, it is necessary to use an objective tube having a ring shaped space between the objective tube 39 and an inner tube 70 supporting the objective 40 for passing a ring shaped illuminating light. It is unfavorable that the air stream introduced in the objective tube 39 flows through said ring shaped space into a main body of the microscope. Therefore it is necessary to close said space by means of a ring plate 71 of transparent material as shown in FIG. 6.

Figure 7:
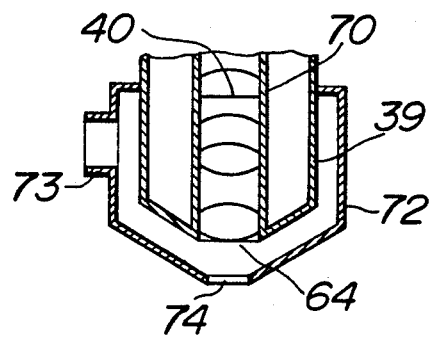
FIG. 7 is a cross section illustrating still another embodiment of the objective tube.

FIG. 7 illustrates another embodiment of the objective tube according to the invention. In this embodiment the opening 64 of the objective tube 39 is closed by the inner tube 70, so that it is impossible to blow the air stream through the opening 64. Thus there is arranged an outer tube 72 having an inlet 73 and a nozzle 74. This outer tube 72 is connected coaxially to the objective tube in an air tight manner.

In the pressure detectors 9 and 44 explained above since the blade 19;51 is made of a strong metal plate, the pressure detectors are not damaged even if a very strong air stream flows in the housing. In practice the pressure of the air pump 12;63 may be set within a range from 500mm $H_2O$ to 2000mm $H_2O$. The pressure in the branch tubes 16, 46 and 17, 49 is preferably set to a value which is substantially equal to a half of the pump pressure. In this case the sensitivity of the pressure detector is very high. For this purpose there are provided the valves 14, 59 and 15, 60 which serve as an air resistance against the air stream flowing therethrough.

It should be noted that the present invention is not limited to the embodiments explained above and many modifications are possible within the scope of the present invention. For example in the above embodiments the air pump is of a compression pump and the air stream blows against the specimen, but the air pump may be of a suction type and the air stream may be sucked from the nozzle. In this case when the distance between the objective and the specimen is decreased, the pressure in the branch tube 16;46 is decreased, which is contrary to the above embodiments. Therefore in the embodiment shown in FIG. 3, for instance the connection between the photo cells 57, 58 and the positive and negative inputs of the differential amplifier 65 should be interchanged. Moreover the arrangement of the light source and the photoelectric converting means may be reversed. Further the light source and the photoelectric converting means may be installed in the housing of the pressure detector. In this case the housing may be formed by opaque material, so that the influence of the ambient light can be avoided.

What is claimed is:

1. An apparatus for automatically adjusting the focus of a microscope, said microscope having a stage on which a specimen may be placed, an objective for forming an image of a specimen placed on the stage, an objective tube in which said objective is installed and a driving member for relatively moving said stage and objective tube in the direction of an optical axis of the objective to adjust the distance between the objective and a specimen, comprising:

a nozzle member mechanically coupled to the objective tube and directed toward the specimen;

a first tube means for connecting the nozzle member to an air pump for producing an air stream flowing through the nozzle member;

a pressure detector including a second tube means having one end coupled to the air pump commonly with the first tube means and having the other end opened to a reference pressure, an air tight housing, a blade member swingably arranged in the housing, a first branch tube means coupled between the first tube means and housing for introducing a pressure inside the first tube means at one side of the blade member, a second branch tube means coupled between the second tube means and housing for introducing a pressure inside the second tube means at the other side of the blade member, and means for detecting a position of the blade member to produce an electrical signal in accordance with swinging movement of the blade member due to a pressure difference between both sides of the blade member; and an electric motor energized by a signal related to said electric signal and mechanically coupled to the driving means of the microscope, whereby the variation of pressure inside the first tube means is detected precisely without being affected by variations in pressure of the air pump for maintaining substantially constant the distance between the objective and a specimen.

2. An apparatus according to claim 1, wherein an upper edge of said blade member of said blade member of said pressure detector is pivotably supported for vertically hanging the blade member by gravitational force.

3. An apparatus according to claim 1, wherein said nozzle member is formed by at least one opening located at a free end of a tube which is coaxially fixed to said objective tube.

4. An apparatus according to claim 1, wherein said microscope comprises a revolving nosepiece and said nozzle member is mechanically coupled to a non-rotating portion of the microscope.

5. An apparatus according to claim 1, wherein said first and second tube means comprise means for forming a variable air resistance against an air stream flowing therethrough.

6. An apparatus according to claim 1, wherein said second tube means is opened to the ambient air through means for forming air resistance against an air stream flowing therethrough.

7. An apparatus according to claim 1, wherein said means for detecting the position of the blade member comprises a light source and a photoelectric converting member arranged opposite to the light source with respect to the blade member, whereby an amount of light received by the photoelectric converting member is changed in accordance with movement of the blade member.

8. An apparatus according to claim 7, wherein said photoelectric converting member comprises a pair of photoelectric converting elements, and said light source and photoelectric converting elements are so arranged that said photoelectric elements receive light of substantially equal amounts when said blade member is in a neutral position.

9. An apparatus according to claim 1, wherein said pressure detector further comprises magnet means, said blade member comprises a magnetic material, and said blade member is held in position by magnetic force produced by said magnet means.

10. An apparatus according to claim 9, wherein a lower edge of said blade member is formed like a knife edge and is inserted in a substantially V-shaped groove formed in the inner surface of a bottom wall of said housing.

11. An apparatus according to claim 1, wherein said nozzle member is formed by at least one opening located at a free end of said objective tube.

12. An apparatus according to claim 11, wherein an annular space between said objective and objective tube is closed by a ring plate of transparent material.

* * * * *